Jan. 5, 1960
G. S. GRUHLKEY
2,919,953
AUTOMATIC DUMPING VEHICLE
Filed Feb. 25, 1957
2 Sheets-Sheet 2
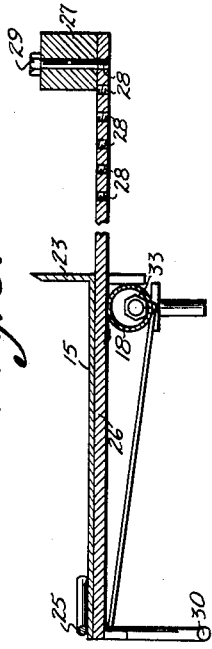
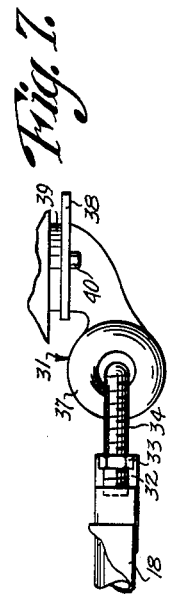
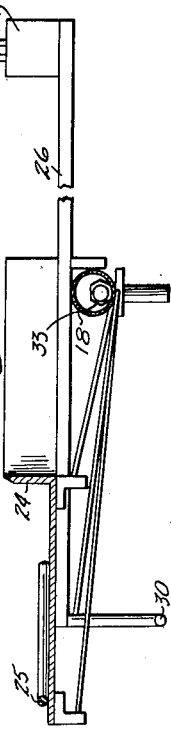
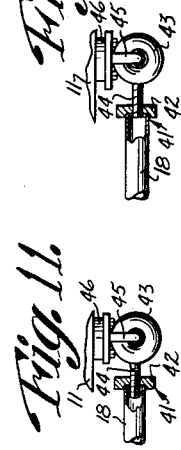
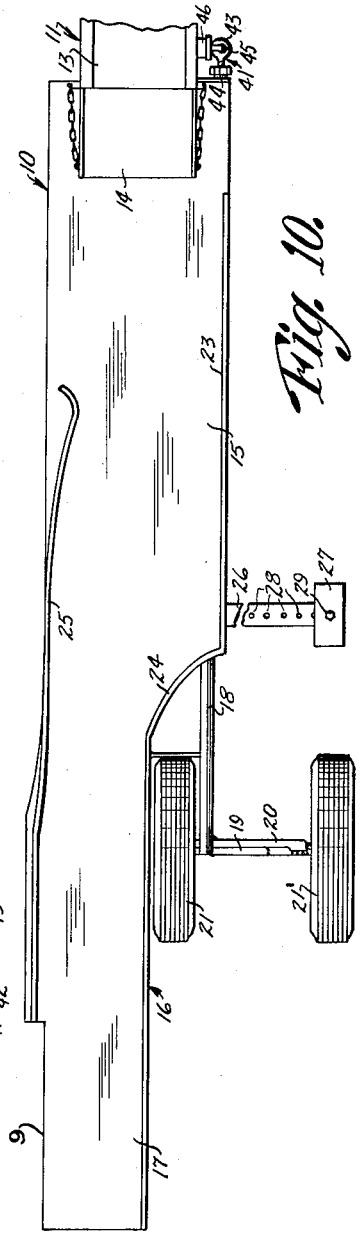
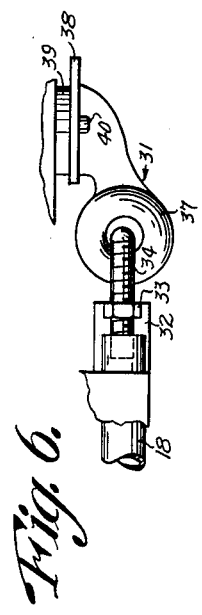
INVENTOR.
George Sylvester Gruhlkey
BY Victor J. Evans & Co.
ATTORNEYS

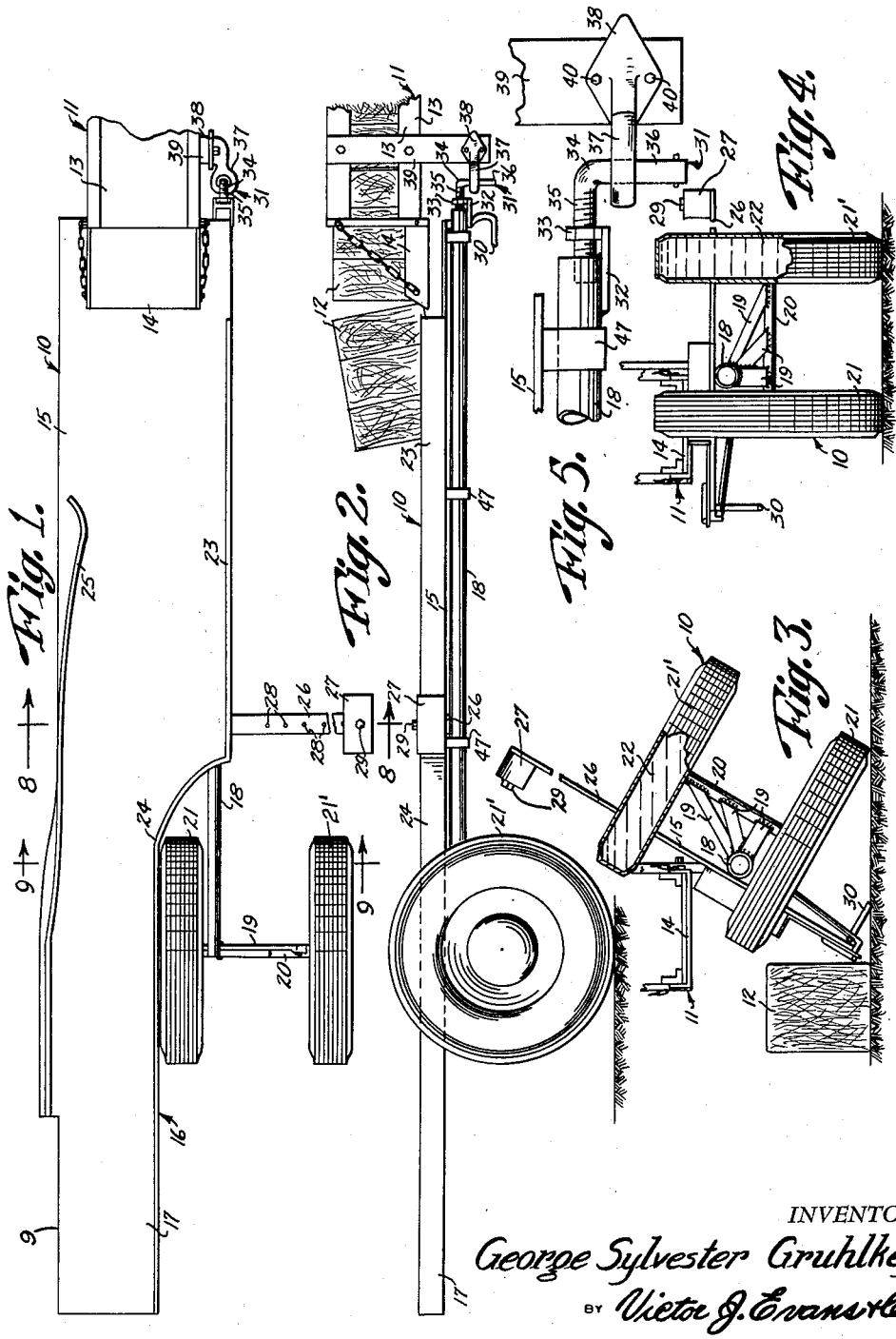

United States Patent Office 2,919,953
Patented Jan. 5, 1960

2,919,953

AUTOMATIC DUMPING VEHICLE

George Sylvester Gruhlkey, Adrian, Tex.

Application February 25, 1957, Serial No. 641,959

7 Claims. (Cl. 298—5)

This invention relates to agricultural equipment, and more particularly to an automatic self-dumping bale carrier.

The object of the invention is to provide a mobile carrier which is adapted to be used for transporting and dumping various materials such as bales of hay, straw, or the like.

Another object of the invention is to provide a mobile carrier which includes a wheeled platform or trailer that is adapted to receive bales of hay or other material from a suitable towing vehicle such as a haybaler, and whereby when a sufficient quantity of material is deposited or received on the trailer, the trailer will automatically tilt so as to automatically dump the load onto the ground.

Another object of the invention is to provide a carrier which is adapted to be connected behind a hay baler so that bales of hay can be deposited onto the carrier of the present invention, and whereby when a sufficient number of bales of hay are received on the carrier, the carrier will automatically dump the bales of hay onto the ground, so that there is provided a means for depositing in one location a plurality of bales of hay, instead of having the individual bales of hay spread out along the field.

A further object of the invention is to provide an automatic self-dumping bale carrier which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a top plan view of the automatic self-dumping bale carrier, constructed according to the present invention.

Figure 2 is a side elevational view of the carrier.

Figure 3 is an end elevational view of the carrier, with parts broken away and in section, and showing the carrier in tilted or dumping position.

Figure 4 is a view similar to Figure 3, but showing the carrier in level position.

Figure 5 is a fragmentary elevational view illustrating the hitch construction.

Figure 6 is a fragmentary plan view of the hitch.

Figure 7 is a view similar to Figure 6, but showing the parts in position as when the carrier is tilted.

Figure 8 is a sectional view taken on the line 8—8 of Figure 1.

Figure 9 is a sectional view taken on the line 9—9 of Figure 1.

Figure 10 is a plan view of the carrier of the present invention showing a modified hitch.

Figure 11 is a fragmentary sectional view of the hitch shown in Figure 10.

Figure 12 is a view illustrating certain constructional details of the assembly.

Referring in detail to the drawings, the numeral 10 designates a carrier which is adapted to be mounted behind the towing vehicle 11 which may be a hay baler. The numeral 12 designates bales of hay which are adapted to be discharged from the baler 11 on to the carrier 10, and the bales of hay 12 are guided onto the trailer 10 by means of a chute or gate 14 which is arranged at the rear of the body 13 of the hay baler 11, Figures 1 and 2.

The carrier 10 of the present invention includes an elongated platform 15 which has a cutaway portion 16 adjacent one side thereof and the cutaway or recessed portion 16 extends or is arranged at the rear of the platform, the platform 15 including a rear portion 17. The rear portion 17 is also provided with a cutaway or recessed portion 9 that is positioned in that side of the platform 15 opposite to the side having the cutaway portion 16 therein, the cutaway portion 9 being located adjacent the rear end of the platform 15 and extending inwardly therefrom.

Extending longitudinally below the platform 15 and secured thereto is a tubular beam 18. Depending from the beam 18 and secured thereto are braces 19, Figure 3, and the braces 19 are secured to an axle 20. A pair of wheels 21 and 21' are mounted on the axle 20 on opposite sides of the rear of the beam 18, and one wheel 21' may have a quantity of liquid 22 therein so as to provide the wheel with increased weight.

Extending upwardly from one side edge of the platform 15 is a side wall 23, and also extending upwardly from the platform 15 are guide members or walls 24 and 25, and these members 23, 24 and 25 coact to insure that the hay bales 12 will be properly guided or maintained on the platform 15 as they move rearwardly therealong.

Arranged at right angles with respect to the longitudinal axis of the platform 15, and secured therebelow, is a transverse bar 26 which has a counterweight 27 mounted on the outer end thereof, Figures 8 and 9. The bar 26 is provided with a plurality of spaced apart openings 28, and a suitable securing element such as a bolt 29 extends through the weight 27 and into engagement with one of the openings 28. Thus, by loosening the bolt 29, the weight 27 can be shifted to different positions on the bar 26 so that the tilting of the carrier or platform can be readily controlled as desired.

Secured beneath the platform 15 adjacent the front end thereof is a drag shoe which is indicated generally by the numeral 30, and the shoe 30 prevents the carrier from digging into the ground as it unloads or tilts.

Referring to Figures 5, 6 and 7 of the drawings, there is shown the hitch mechanism which is indicated generally by the numeral 31, and the hitch mechanism 31 serves to provide a pivotal connection between the carrier 10 and the hay baler 11. Due to the provision of construction of the hitch mchanism 31, the platform 15 can tilt from the position shown in Figure 4 to the position shown in Figure 3 as when a plurality of bales of hay are to be unloaded.

The hitch mechanism 31 includes a plate 32 which is secured as by welding, to the front end of the tubular beam 18, and secured to the plate 32 is a securing element or nut 33. An L-shaped hook 34 includes a threaded portion 35 which threadedly engages the nut 33, and the hook 34 further includes a transverse portion 36 that is arranged in engagement with a ring 37. The ring 37 includes a base 38 and is adapted to be secured to a support member 39 on the hay baler 11, through the medium of securing elements 40.

Referring to Figures 10, 11 and 12 of the drawings, there is shown a modified hitch which is indicated generally by the numeral 41, and the hitch 41 is adapted to be used in lieu of the previously described hitch 31.

The hitch 41 includes a plug or securing element 42 which is secured to the front end of the tubular beam 18, and a ring 43 has a threaded shank 44 which threadedly engages the plug 42. A hook 45 extends from a support member 46 which is on the hay baler 11, and the hook 45 engages the ring 43.

The tubular beam 18 may be secured to the platform 15 through the medium of brackets 47.

From the foregoing it is apparent that there has been provided a self-dumping bale carrier, and in use, the carrier 10 of the present invention is adapted to be mounted behind a towing vehicle such as a hay baler 11. The hay baler 11 will, therefore, discharge the bales of hay 12 onto the platform 15, and the bales of hay will be guided onto the platform by means of the gate or chute 14. As each additional bale of hay is discharged from the hay baler, the bales of hay already on the platform will be moved rearwardly therealong, and when sufficient bales of hay are deposited on the platform 15, as for example, 4, 5, or 6 bales of hay, then the weight of these bales of hay will overcome the weight such as the weight 27 so as to cause the platform 15 to tilt and as the platform tilts the bales of hay 12 will be discharged therefrom, as for example, as shown in Figure 3. Then, as soon as the bales of hay have been unloaded, the carrier or platform will automatically right itself. This tilting movement of the platform 15 is permissible due to the provision of the hitch 31 or the hitch 41. Thus, when the platform 15 tilts as during unloading of the bales of hay, the platform 15 and tubular beam 18 can rotate since the threaded portion 35 of the hook 34 threadedly engage the nut or securing element 33 so that it will be seen that relative turning movement is permissible or possible as between the beam 18 and hook 34. The hook 34 includes the transverse portion 36 that is arranged in engagement with the ring 37, and as shown in Figures 4, 6 and 7, the ring 37 is secured to the hay baler 11.

In the modification shown in Figures 10, 11 and 12, instead of having the ring secured to the hay baler, the hook such as the hook 45 is secured to the hay baler, and the ring 43 includes a shank 44 which threadedly engages the nut 42 that is secured on the front end of the tubular beam 18. Thus, in the hitch 41 the parts are reversed from the arrangement shown in Figures 5, 6 and 7.

As previously described, the weight 27 is mounted on the bar 26 by means of the bolt 29 which extends through the weight 27 and into engagement with certain of the openings 28, whereby the position of the weight 27 can be adjusted as desired in order to control the weight of bales of hay or numbers of bales of hay that are necessary to cause the tilting or unloading of the carrier. As shown in Figures 1 and 10, the platform 15 includes the rear portion 17 which is arranged so as to facilitate dumping of the bales of hay when the platform tilts or pivots.

The drag shoe 30 prevents the carrier or platform from accidentally digging into the ground, and since the drag shoe 30 is made of a spring like material, the drag shoe will have a tendency to cause the platform to return to a horizontal position after the bales of hay have been unloaded.

While the present invention has been described as being used for unloading bales of hay, it is to be understood that it can be used for handling other materials.

However, it is to be noted that when the platform 15 tilts or moves from the position shown in Figure 4 to the position shown in Figure 3, all of the bales of hay thereon will be dumped or unloaded in a single locality and this has the advantage of insuring that individual bales of hay will not be scattered throughout the field. Thus, a pickup truck or the like can more easily locate and gather in the bales of hay when they are arranged in a single locality instead of being spread over a wide area. While the primary object of the invention has been set forth, there may be times when it is advisable to only unload one bale at a time and the cutaway portion 9 is provided in the platform to permit easier dumping of one bale at a time if the operator so desires.

The hitch 41 shown in Figures 10, 11 and 12 permits the same type of tilting motion of the platform 15, since the beam 18 can rotate with respect to the shank 44 and ring 43, whenever the load of hay thereon is sufficiently great so as to overcome the weight of the member 27. As shown in Figure 3, the load rocks on the innermost wheel 21 so that the wheel 21 arranged inwardly acts as a fulcrum of pivot. The outer wheel 21' may be loaded with a suitable liquid such as water or antifreeze so as to help maintain the apparatus in balanced position. As each additional bale is discharged from the hay baler, the bales of hay already on the platform 15 are shoved along the platform until the carrier is loaded and then the carrier automatically tilts and unloads. The weight 27 can be moved to different positions so as to permit the apparatus to be adjusted for different loads, as for example, different sizes of bales or bales of hay which may be heavier or lighter in weight. The weight 27 serves to bring the carrier back to loading position after the bales of hay have been discharged. By dumping a plurality of bales in one location, there will result a saving in time and effort as when the bales of hay are being picked up from the field. By dumping the bales in one area, the bales can be more readily and easily seen so that there will be less possibility of overlooking any bales of hay. Also, the expense of handling the bales is minimized or reduced. The walls 23, 24 and 25 maintain the bales of hay in their proper position on the platform 15 and insure that the bales of hay will not accidentally fall off until the platform tilts or pivots. Thus, it will not be necessary to stop and pick up individual bales of hay and this results in an economy of fuel when operating various vehicles around a farm or the like. The hitch 31 or the hitch 41 acts as a swivel which can be adjusted and this swivel hitch permits the table or platform to easily move as during the dumping operation, or during the loading operation. The cutaway portion 16 in the platform 15 is arranged as shown in Figures 1 and 10, and as the bales move rearwardly, the construction of the platform 15 including the cutaway portion 16 and rearward portion 17 helps facilitate the dumping operation since the bale moves outwardly and sidewise. The drag shoe 30 on the left front end of the platform prevents the platform from digging into the ground or hanging up.

In the present construction, there is a minimum number of parts and the rugged construction insures that the device will not readily get out of order. The hook on the hitch is adjustable, and the carrier of the present invention will assemble and dump bales of hay in piles, and as previously described, other materials besides hay can be handled and dumped. The bales are received from the baler and when the carrier receives sufficient load to overbalance the carrier, the load will be dumped and after dumping, the weight 27 will return the parts to the normal position ready for the next loading. Thus, by dumping the plurality of bales in a pile, there will be a saving in fuel and manpower in gathering up the bales from the field since it is not necessary to stop and pick up single bales which may be scattered throughout the field. Upkeep is very low and since the carrier has only the two wheels 21, the device can be readily pulled and handled. The carrier hitches onto the rear of the baler and the hitch constitutes a swivel which permits the proper movement. The platform 15 is arranged at such an elevation or level so that it conveniently receives the bales 12 and the weight 27 can be adjusted to different positions to compensate for heavier or lighter bales, as for example, when the bales are wet or dry. Suitable braces can be used wherever desired or required. The parts can be made of any suitable material and in any desired shape or size. The wheel 21' on the outside has liquid 22 therein for counterbalancing purposes.

I claim:

1. In a self-dumping load carrier, an elongated platform having a front and rear end, a horizontally disposed axle secured beneath said platform adjacent said rear end and extending transversely thereof, inner and outer spaced parallel wheels rotatably mounted on said axle with both wheels positioned to one side of the longitudinal center line of said platform, and a universal hitch means connected to the front end of said platform and positioned to the same side of the longitudinal center line of said platform as said wheels.

2. In a self-dumping load carrier as in claim 1, wherein a counterweight is mounted beneath said platform and extends outwardly of said platform on the same side as said wheels and beyond at least one of said wheels.

3. In a self-dumping load carrier, an elongated platform having front and rear ends, a portion of one side of said platform being inset, with the inset providing an opening that is positioned to one side of the longitudinal center line of the platform and extends through the platform from the bottom surface upwardly and also extends longitudinally of said platform from the rear end toward the front end, a tubular beam extending longitudinally beneath said platform and secured thereto with the rear end of said beam terminating beneath the inset portion of said platform, and the front end of said beam terminating adjacent the front end of the platform, a horizontally disposed axle positioned adjacent to and secured at right angles with respect to the rear end of said beam, a pair of spaced parallel wheels rotatably mounted on said axle to the same side of the longitudinal center line of said platform as said inset and the depth of said inset being sufficient to receive at least one of said wheels within the inset portion of said platform, spaced apart guide members positioned adjacent to and secured along the side edges of said platform and extending upwardly therefrom, and a universal hitch means connected to the front end of said tubular beam for connecting said carrier to the rear end of a hay baler, a bar extending transversely below said platform with one end portion thereof secured to the undersurface of said platform and with the other end portion thereof positioned on the same side of the center line of said platform as said wheels and extending laterally of said platform beyond at least one of said wheels, and a counter-weight adjustably connected to said other end portion of said bar.

4. The structure as defined in claim 3, wherein said hitch means comprises a plate secured to said tubular beam adjacent the front end thereof, an internally threaded securing element secured to said plate, a hook having a portion extending in the same direction as the longitudinal axis of the beam and threadedly engaging said securing element and said hook further including a transverse portion, and a ring connected to the hay baler for receiving the transverse portion of said hook.

5. The structure as defined in claim 4, wherein said hitch means comprises an internally threaded securing element connected to the front end of said tubular beam, a ring having a shank threadedly engaging said securing element, and a hook secured to said hay baler and engaging said ring, and a drag shoe mounted beneath said platform adjacent the edge thereof and on that side of the center line of said platform opposite to said wheels.

6. A self-dumping load carrier, comprising an elongated platform having front and rear ends and with a portion of one side thereof inset, with said inset providing a cavity in the platform that is positioned to one side of the longitudinal center line of the platform and extending through the platform from the bottom surface upwardly and also extends longitudinally of said platform from the rear end toward the front end thereof, a tubular beam extending longitudinally beneath said platform and secured thereto with the rear end of said beam terminating beneath the inset portion of said platform, an axle extending in a plane parallel to said platform and secured at right angles to the rear end of said beam, a pair of spaced parallel wheels rotatably mounted on said axle on the same side of the longitudinal center line of said platform as said inset and the depth of said inset being sufficient to receive at least one of said wheels within the inset portion of said platform, so that the inset portion of said platform extends rearwardly of and is arranged to one side of said one wheel and extends rearwardly beyond said wheels, spaced apart guide members arranged along the side edges of said platform and extending upwardly therefrom, universal hitch means mounted on the same side of the longitudinal center line of the platform as said wheels for connecting said carrier to a towing vehicle, a bar extending transversely beneath said platform with the inner end portion thereof secured to the undersurface of said platform and with the outer end portion thereof extending laterally of said platform beyond at least one of said wheels, and a counterweight adjustably connected to the outer end portion of said bar.

7. In a self-dumping load carrier, an elongated platform, a tubular beam extending longitudinally beneath said platform and secured thereto adjacent one side thereof, with the rear end thereof terminating inwardly of one end of said platform and with the other end terminating outwardly of the other end thereof, an axle secured to the rear end of said beam at right angles thereto, inner and outer spaced parallel wheels rotatably mounted on said axle outwardly of and adjacent said one side of said platform, spaced apart guide members positioned adjacent to and secured along the side edges of said platform and extending upwardly therefrom, a universal hitch means connected to the front end of said tubular beam for connecting said carrier to the rear end of a hay baler, and the outer one of said wheels being filled with liquid to provide a counter-balance for said load carrier.

References Cited in the file of this patent

UNITED STATES PATENTS

| | | |
|---|---|---|
| 98,044 | Esch | Dec. 21, 1869 |
| 536,865 | Fetters | Apr. 2, 1895 |
| 980,976 | Ledford | Jan. 10, 1911 |
| 1,732,461 | Cummins et al. | Oct. 22, 1929 |
| 2,531,560 | De Wall | Nov. 28, 1950 |
| 2,672,808 | Eldhert | Mar. 23, 1954 |

FOREIGN PATENTS

| | | |
|---|---|---|
| 8,264 | Denmark | Feb. 8, 1906 |